United States Patent
Li et al.

(10) Patent No.: US 10,985,581 B2
(45) Date of Patent: Apr. 20, 2021

(54) MULTI-COIL PLACEMENT METHOD FOR POWER TRANSMITTER IN WIRELESS CHARGING SYSTEM

(71) Applicant: Shenzhen Yichong Wireless Power Technology Co. Ltd., Guangdong (CN)

(72) Inventors: Tun Li, San Jose, CA (US); Dawei He, Burlingame, CA (US); Siming Pan, San Jose, CA (US); Fangming An, Beijing (CN); Jingdong Sun, Rolla, MO (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 572 days.

(21) Appl. No.: 15/892,043

(22) Filed: Feb. 8, 2018

(65) Prior Publication Data
US 2019/0052103 A1   Feb. 14, 2019

Related U.S. Application Data

(60) Provisional application No. 62/460,615, filed on Feb. 17, 2017.

(51) Int. Cl.
*H02J 7/00* (2006.01)
*H02J 50/10* (2016.01)
*H02J 7/02* (2016.01)

(52) U.S. Cl.
CPC ............ *H02J 7/0042* (2013.01); *H02J 7/025* (2013.01); *H02J 50/10* (2016.02)

(58) Field of Classification Search
CPC .. H02J 17/00; H02J 7/025; H02J 50/10; H02J 50/12; H02J 7/0042
See application file for complete search history.

(56) References Cited

U.S. PATENT DOCUMENTS

| | | | | |
|---|---|---|---|---|
| 2012/0313577 A1* | 12/2012 | Moes | ................... | H02J 50/402 320/108 |
| 2014/0125140 A1* | 5/2014 | Widmer | ................ | B60L 53/122 307/104 |
| 2015/0236513 A1* | 8/2015 | Covic | ..................... | H02J 7/025 307/104 |
| 2016/0285317 A1 | 9/2016 | Maniktala | | |

FOREIGN PATENT DOCUMENTS

| | | |
|---|---|---|
| CN | 103280848 A | 9/2013 |
| CN | 103532255 A | 1/2014 |
| CN | 203632526 U | 6/2014 |

OTHER PUBLICATIONS

Search Report and Written Opinion for International Application PCT/CN2018/076389, dated May 3, 2018 (8 Pages).

* cited by examiner

*Primary Examiner* — David V Henze-Gongola
(74) *Attorney, Agent, or Firm* — Sheppard Mullin Richter & Hampton LLP (57) ABSTRACT

A multi-coil placement method of a wireless charging system is disclosed. The method may include obtaining a width parameter of an effective charging area a and a width parameter of a power transmitter coil b, calculating a ratio of the width parameters a/b, determining a shape, size and number of layers of mesh cells based on the ratio of a/b, determining a layout of the mesh cells, covering a required charging area using the mesh cells based on the determined shape, size, number of layers, and layout, and replacing the mesh cells with the power transmitter coils.

20 Claims, 10 Drawing Sheets

100

- 101: Obtain the width parameter of the effective charging area "$a$" and the length width of the physical TX coil "$b$"
- 102: Calculate the ratio "$a/b$", and determine the mesh cells shape, size and number of layers
- 103: Determine the layout of the mesh cells
- 104: Cover a required charging area using mesh cells based on the placement pattern
- 105: Replace mesh cells by physical TX coils to complete the multi-coil placement

FIG. 3B Rectangle Mesh Cell

FIG. 3A Triangle Mesh Cell

MULTI-COIL PLACEMENT METHOD FOR POWER TRANSMITTER IN WIRELESS CHARGING SYSTEM

CROSS-REFERENCE TO RELATED APPLICATIONS

This application claims the benefit of U.S. Provisional Application Ser. No. 62/460,615, filed Feb. 17, 2017, and entitled "MULTI-COIL PLACEMENT METHOD FOR POWER TRANSMITTER IN WIRELESS CHARGING SYSTEM". The entirety of the aforementioned application is incorporated herein by reference.

TECHNICAL FIELD

The disclosure relates generally to a wireless charging method and system, particularly, to a system with multiple power transmitter coils and a method for multi-coil placement for a power transmitter in a wireless charging system.

BACKGROUND

Wireless charging is an evolving technology that may bring a new level of convenience of charging electronic devices. In a wireless charging system, particularly an inductive wireless charging system, energy is transferred from one or more power transmitter (TX) coils to one or more power receiver (RX) coils through magnetic coupling.

A wireless charging system that contains only one TX coil is a single-coil system. The system's charging area only covers a limited area near the TX coil's center. To expand the charging area, one possible approach is to use multiple TX coils in a wireless charging system, which is called a multi-coil system.

There may be several disadvantages in a current multi-coil system. First, using more TX coils will increase overall cost. Second, stacking TX coils on multiple layers may introduce uniformity problems and increase the thickness of the system. In addition, a multi-coil design may result in charging dead zones. A placement pattern of a multi-coil system may be designed to minimize or even overcome these disadvantages. In addition, the placement design may be flexible and adaptive to different TX coil designs and different charging area requirements.

Therefore, a multi-coil placement method and design patterns that overcome the above shortcomings are desired for a multi-coil wireless charging system.

SUMMARY

One aspect of this disclosure is directed to a method for placing power transmitter coils in a wireless charging system. The method may include obtaining a width parameter of an effective charging area a and a width parameter of a power transmitter coil b, calculating a ratio of the width parameters a/b, determining a shape, size and number of layers of mesh cells based on the ratio of a/b, determining a layout of the mesh cells, covering a required charging area using the mesh cells based on the determined shape, size, number of layers, and layout, and replacing the mesh cells with the power transmitter coils.

Another aspect of this disclosure is directed to a wireless charging system. The system may include a charging area and a plurality of power transmitter coils placed to cover the charging area. Each power transmitter coil may have an effective charging area. A radius of the effective charging area may be denoted as a, and a half of a width of the power transmitter coil may be denoted as b. In one embodiment, the ratio of a/b is no less than $\sqrt{2}$, and the plurality of power transmitter coils may be placed on one layer and centers of adjacent power transmitter coils may be spaced with a length parameter w, where, w≤$\sqrt{2}$a. Centers of adjacent four power transmitter coils may form a square. In another embodiment, $$\frac{2}{\sqrt{3}} \le \frac{a}{b} < \sqrt{2},$$

the plurality of power transmitter coils may be placed on one layer and centers of adjacent power transmitter coils may be spaced with a length parameter w, where, w≤$\sqrt{3}$a. Centers of adjacent three power transmitter coils may form an equilateral triangle. In another embodiment, $$1 \le \frac{a}{b} < \frac{2}{\sqrt{3}},$$

the plurality of power transmitter coils may be placed on two layers and on each layer and centers of adjacent power transmitter coils may be spaced with a length parameter w, where, w≤2a. On each layer, centers of adjacent four power transmitter coils may form a square, and each of the power transmitter coils on the second layer may be placed in a central area of the square formed by the centers of adjacent four power transmitter coils on the first layer. In another embodiment, $$\frac{2}{3} \le \frac{a}{b} < 1,$$

the plurality of power transmitter coils may be placed on three layers and, on each layer, centers of adjacent power transmitter coils may be spaced with a length parameter w, where, w≤3a, on each layer, centers of adjacent three power transmitter coils may form an equilateral triangle, each of the power transmitter coils on the third layer may be placed in a central area of the equilateral triangle formed by the centers of the power transmitter coils on the second layer, and each of the power transmitter coils on the second layer may be placed in a central area of the equilateral triangle formed by the centers of the power transmitter coils on the first layer.

Another aspect of this disclosure is directed to a wireless charging system. The system may include a charging area, a plurality of power transmitter coils placed to cover the charging area and each power transmitter coil having an effective charging area. A radius of the effective charging area may be denoted as a, and a half of a width of the power transmitter coil may be denoted as b. Centers of power transmitter coils may be spaced with a distance w. In one embodiment, the ratio of a/b is no less than $\sqrt{2}$, and w is not larger than $\sqrt{2}$a. In another embodiment, the ratio of a/b is $$\frac{2}{\sqrt{3}} \le \frac{a}{b} < \sqrt{2},$$

and w≤$\sqrt{3}$a. In another embodiment, the ratio of a/b is $$1 \leq \frac{a}{b} < \frac{2}{\sqrt{3}},$$

and w≤2a. In another embodiment, the ratio of a/b is $$\frac{2}{3} \leq \frac{a}{b} < 1,$$

and w≤3a.

Another aspect of this disclosure is directed to a wireless charging system. The system may include a charging area, and a plurality of power transmitter coils placed on one layer to cover the charging area. Centers of every three adjacent power transmitter coils may form an equilateral triangle.

Another aspect of this disclosure is directed to a wireless charging system. The system may include a charging area and a plurality of power transmitter coils placed on one layer to cover the charging area. Centers of every four adjacent power transmitter coils may form a square.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

This disclosure proposes a systematical method of the placement of multiple coils for a power transmitter of a multi-coil wireless charging system. The goal is to use fewer TX coils to form a larger continuous wireless charging area without charging dead zones. A virtual mesh cell placement pattern is used as a visual guide to illustrate the placement pattern of the TX coils. The placement pattern of the mesh cells refers to the shape, size, number of layers and the layout of mesh cells. In real placement, each mesh cell will be replaced by one TX coil. The location, shape and size of the mesh cells may determine the location of the TX coils and the distance between any two adjacent TX coils on the same layer.

Figure 1:
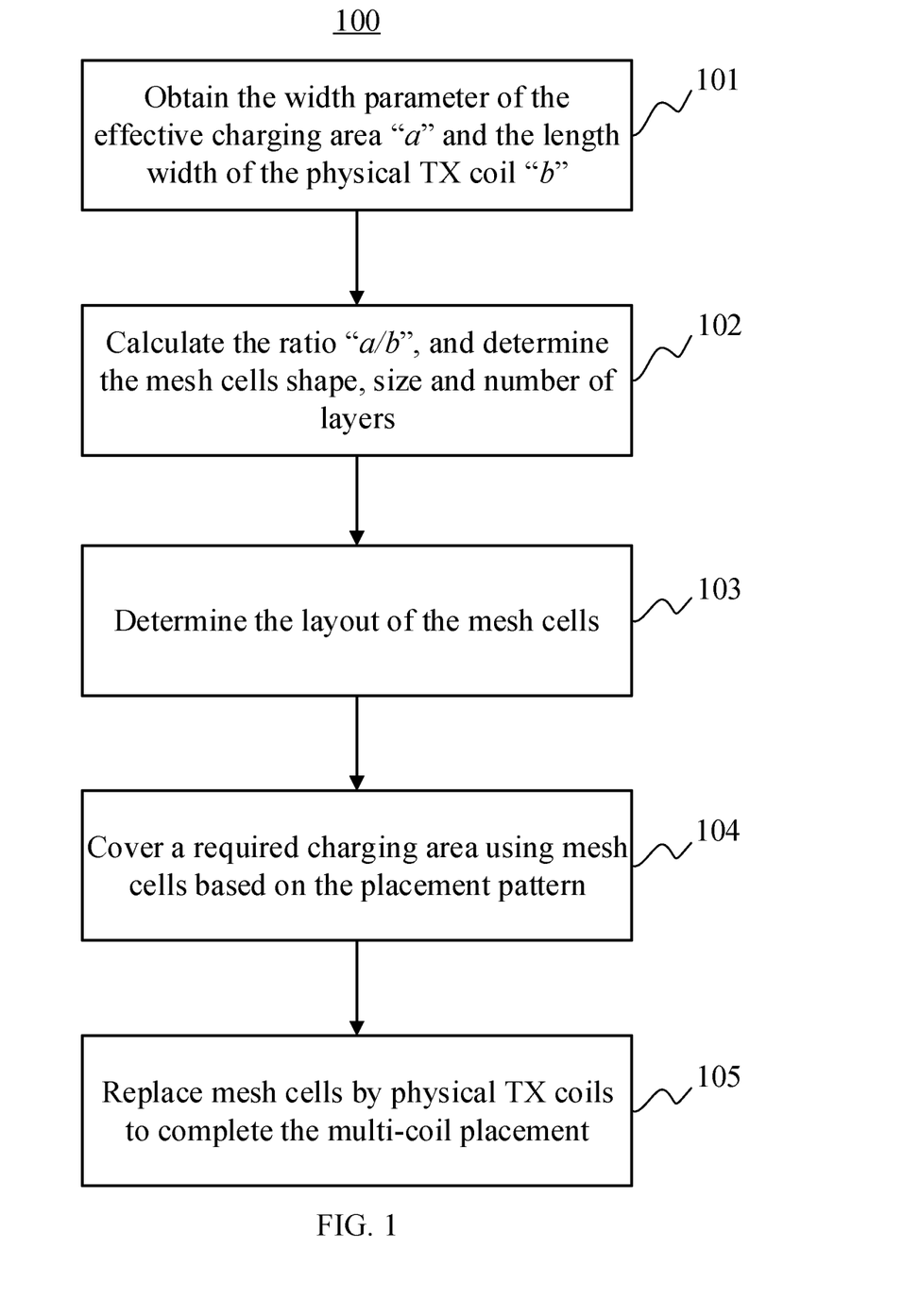
FIG. 1 is a flow diagram illustrating a multi-coil placement method for power transmitters, consistent with exemplary embodiments of the present disclosure.

FIG. 1 is a flow diagram illustrating a multi-coil placement method 100 for TXs in a wireless charging system, consistent with exemplary embodiments of the present disclosure.

At step 101, (1) a width parameter of an effective charging area a, and (2) a width parameter of a physical TX coil b, are obtained. For example, if an area has a circular shape, the width parameter is the radius of the circular shape; and if the area has a square shape, the width parameter is the half length of the side of the square. At step 102, the ratio of a/b is calculated. Based on this ratio, the shape, size and number of layers of the mesh cells can be determined by physical equations and calculations as will be described below. At step 103, a layout of the mesh cells is determined. Till this step, the overall placement pattern of the mesh cells is determined. At step 104, a required charging area is covered by the mesh cells based on the determined placement pattern. At step 105, physical TX coils are placed on the locations illustrated by the mesh cells to complete the multi-coil placement for TXs in the wireless charging system.

Figure 2A:
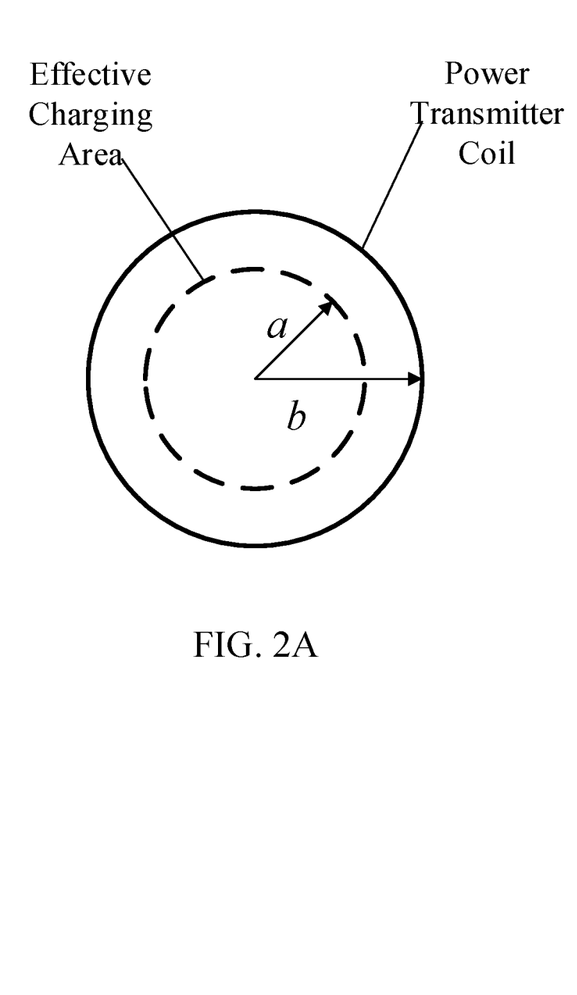
FIGS. 2A-2B are graphical representations illustrating width parameters of effective charging areas and TX coils, consistent with exemplary embodiments of the present disclosure.
Figure 2B:
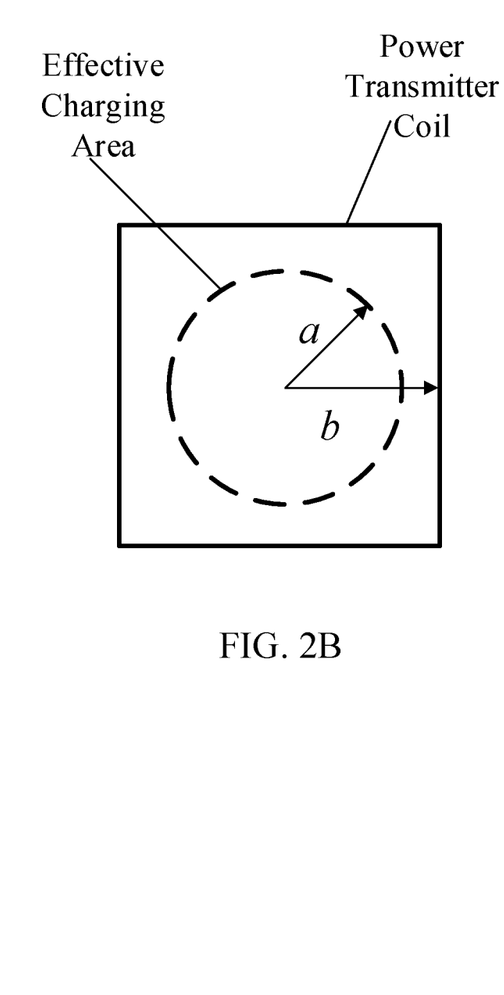

FIGS. 2A-2B are graphical representations illustrating a width parameter of an effective charging area and a width parameter of a TX coil, with two exemplary embodiments. The effective charging area refers to a charging area of one single TX coil, where if the center of a RX coil is placed inside of the area, a coil-to-coil efficiency should be no less than a desired value (e.g., a value desired or pre-determined by a user). The effective charging area is often evaluated by the width parameter. The width parameter of an effective charging area, denoted as a, is defined as the maximum horizontal distance between the center of a TX coil and the center of a RX coil, where if the center of a RX coil is placed inside of the range defined by the width parameter of the effective charging area, the coil-to-coil efficiency should be no less than a desired value. The coil-to-coil efficiency is an efficiency between a TX coil and a RX coil, and is calculated by the ratio of the RX coil output power over the TX coil input power. This efficiency is validated through both measurements and simulations. The loss that affects the coil-tocoil efficiency includes the coil-to-coil loss and the parasitic resistance loss of the TX and RX matching capacitor. A desired coil-to-coil efficiency, for example, 90%, can be pre-determined/given by the manufacturer or vendor, or defined by a customer of a wireless charging system. In this example, where the desired coil-to-coil efficiency is 90%, the effective charging area is defined as the area, in which, if the center of the RX coil is placed, the coil-to-coil efficiency should be no less than 90%.

In some embodiments, the effective charging area may be defined by a charging efficiency of the wireless charging system. The charging efficiency of the system refers to the ratio of a receiver side output power over a transmitter side input power. A typical threshold for the charging efficiency of the system may be 60%. If the center of a RX coil is placed inside the effective charging area, the charging efficiency of the system may be no less than 60%.

For a circular-shaped effective charging area, a is the radius of the area, as shown in FIGS. 2A-2B. The width parameter of a physical TX coil, denoted as b, is a parameter used to quantify the size of one single TX coil. For a circular-shaped TX coil, b is the radius of the TX coil, as shown in FIG. 2A.

The effective charging areas and the TX coils are not limited to a circular shape. The width parameters a and b can be easily adapted to different shapes. For example, if the shape of a TX coil is a square, the width parameter b can be presented as half of the TX coil's side length, as shown in FIG. 2B. When the desired coil-to-coil efficiency is defined, the effective charging area can be defined by the width parameter b and the coil-to-coil efficiency.

Figure 3A:
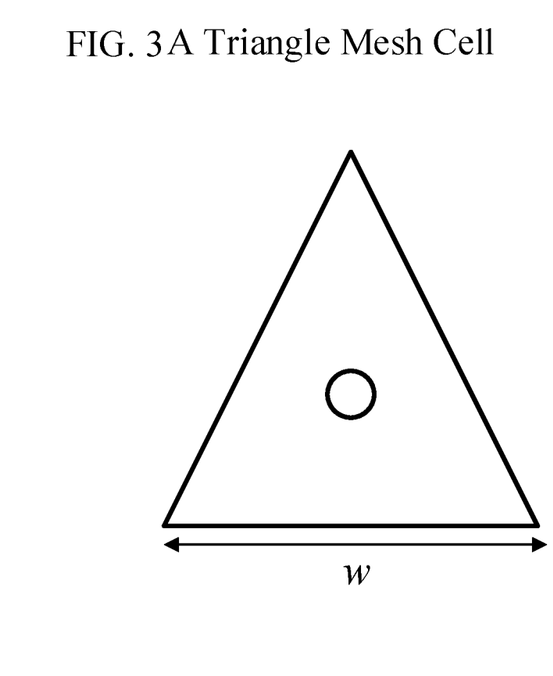
FIGS. 3A-3B are graphical representations illustrating shapes and sizes of mesh cells, consistent with exemplary embodiments of the present disclosure.
Figure 3B:
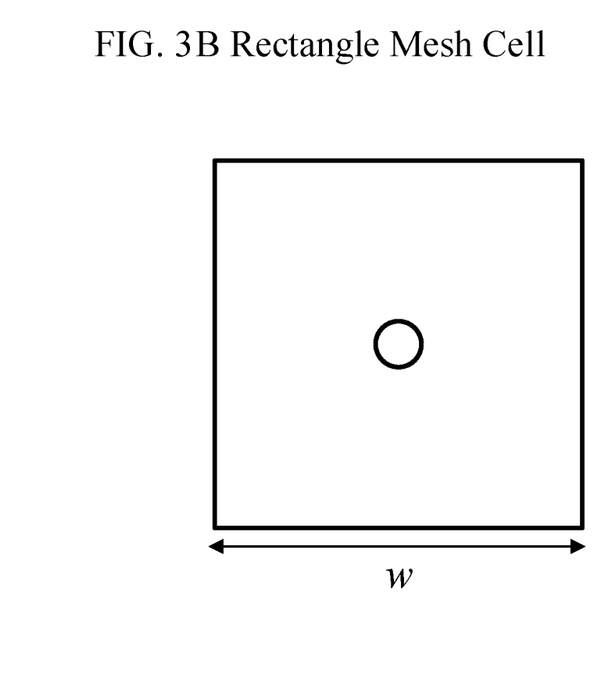

FIGS. 3A-3B represent two exemplary types of mesh cells, a triangle mesh cell and a rectangle mesh cell. In one embodiment, the triangle mesh cell may be an equilateral triangle. In another embodiment, the rectangle mesh cell may be a square. The circles shown in the mesh cells indicate the centers of the mesh cells. When the physical TX coils are placed at step 104, the location of the centers of physical TX coils will correspond to the location of these circles in the mesh cells.

FIGS. 3A-3B illustrate a length parameter of mesh cells, denoted as w. It is the length of one side of a mesh cell. The length parameter w also corresponds to the distance between two adjacent TX coils in placement. The distance is measured from the centers of two adjacent TX coils located on the same layer.

The shape of the mesh cells, the range of the length parameter w, and the number of layers are correlated and determined by the ratio of a/b. Therefore, the mesh cell placement pattern is determined by the ratio of a/b. The correlation among a/b, mesh cell shape, w, and the number of layers are presented in the Table 1 below.

TABLE 1

| Scenarios | Parameter | Layer Number | Mesh Cell Shape | Mesh Cell Width |
|---|---|---|---|---|
| No. 1 | $\frac{a}{b} \geq \sqrt{2}$ | 1 | Square | $w \leq \sqrt{2}a$ |
| No. 2 | $\frac{2}{\sqrt{3}} \leq \frac{a}{b} < \sqrt{2}$ | 1 | Triangle | $w \leq \sqrt{2}a$ |
| No. 3 | $1 \leq \frac{a}{b} < \frac{2}{\sqrt{3}}$ | 2 | Square | $w \leq 2a$ |

TABLE 1-continued

| Scenarios | Parameter | Layer Number | Mesh Cell Shape | Mesh Cell Width |
|---|---|---|---|---|
| No. 4 | $\frac{2}{3} \leq \frac{a}{b} < 1$ | 3 | Triangle | $w \leq 3a$ |

A larger w means a larger distance between two adjacent TX coils, resulting in a lower density of TX coils on one layer. Therefore, a larger w may reduce the total number of TX coils in a required charging area.

Figure 4:
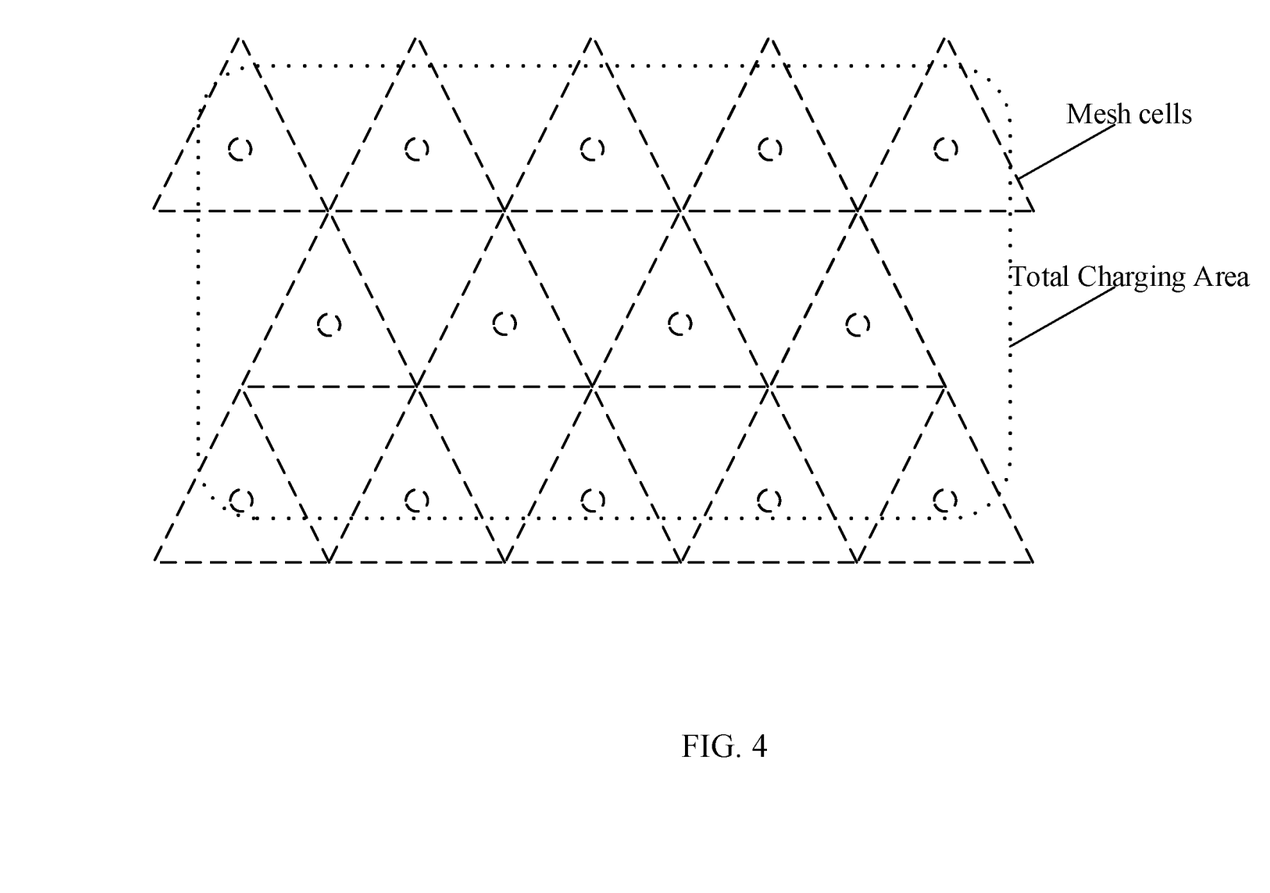
FIG. 4 is a graphical representation illustrating a one-layer triangle mesh cell placement pattern, consistent with exemplary embodiments of the present disclosure.

FIG. 4 shows a layout of a one-layer triangle mesh cell placement pattern. The dotted rectangle represents a required charging area. The required charging area can be a charging area required or desired by a customer, a product designer, etc. The dash-line triangles with circles at their centers represent triangle mesh cells. The mesh cells cover most part of the required charging area, with their vertices connecting to the vertices of their adjacent mesh cells. In one exemplary embodiment, the number of the mesh cells is the minimal number of mesh cells that cover most part of the required charging area. In the embodiment shown in FIG. 4, all the mesh cells orient in the same direction, and do not overlap with each other on the same layer.

Figure 5:
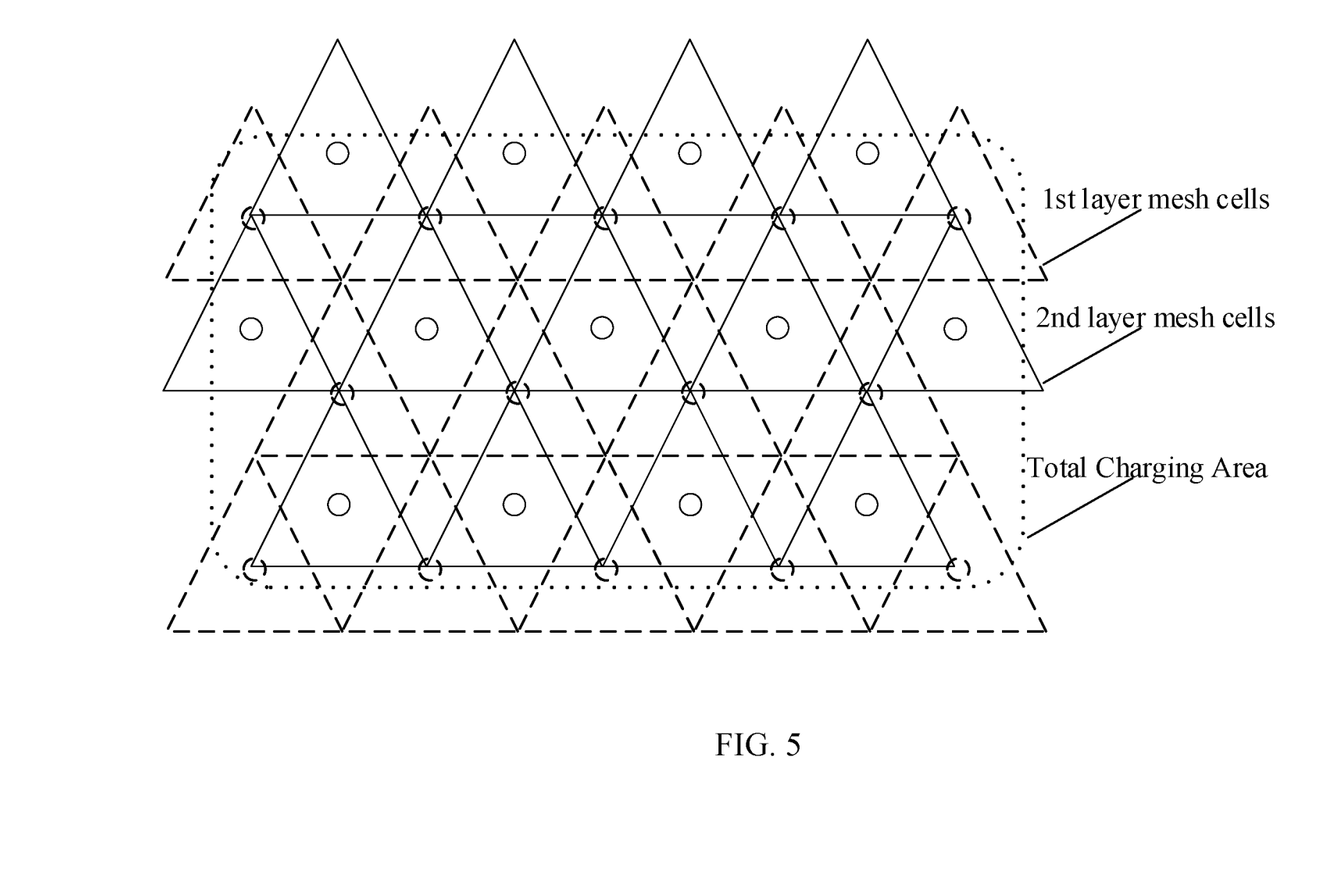
FIG. 5 is a graphical representation illustrating a two-layer triangle mesh cell placement pattern, consistent with exemplary embodiments of the present disclosure.

FIG. 5 shows a layout of a two-layer triangle mesh cell placement pattern. The dotted rectangle represents the required charging area. The dash-line triangles with circles at the centers represent the first-layer triangle mesh cells. Their placement pattern is the same as shown in FIG. 4. The solid-line triangles with circles at the centers represent the triangle mesh cells on the second layer. The solid-line mesh cells cover most part of the required charging area on the second layer, and their locations are determined by the centers of three adjacent triangle mesh cells on the first layer. As shown in FIG. 5, the vertices of every second-layer triangle locate at the position of the center circles of adjacent first-layer triangles. In one exemplary embodiment, the number of the mesh cells on the second layer is the number of mesh cells that can connect all of the centers of the mesh cells on the first layer. In another exemplary embodiment, the number of the mesh cells on the second layer is the minimal number of mesh cells that cover most part the required charging area. Similarly, the second-layer mesh cells orient in the same direction, connect each other with their vertices, and do not overlap with each other on the same layer.

Figure 6:
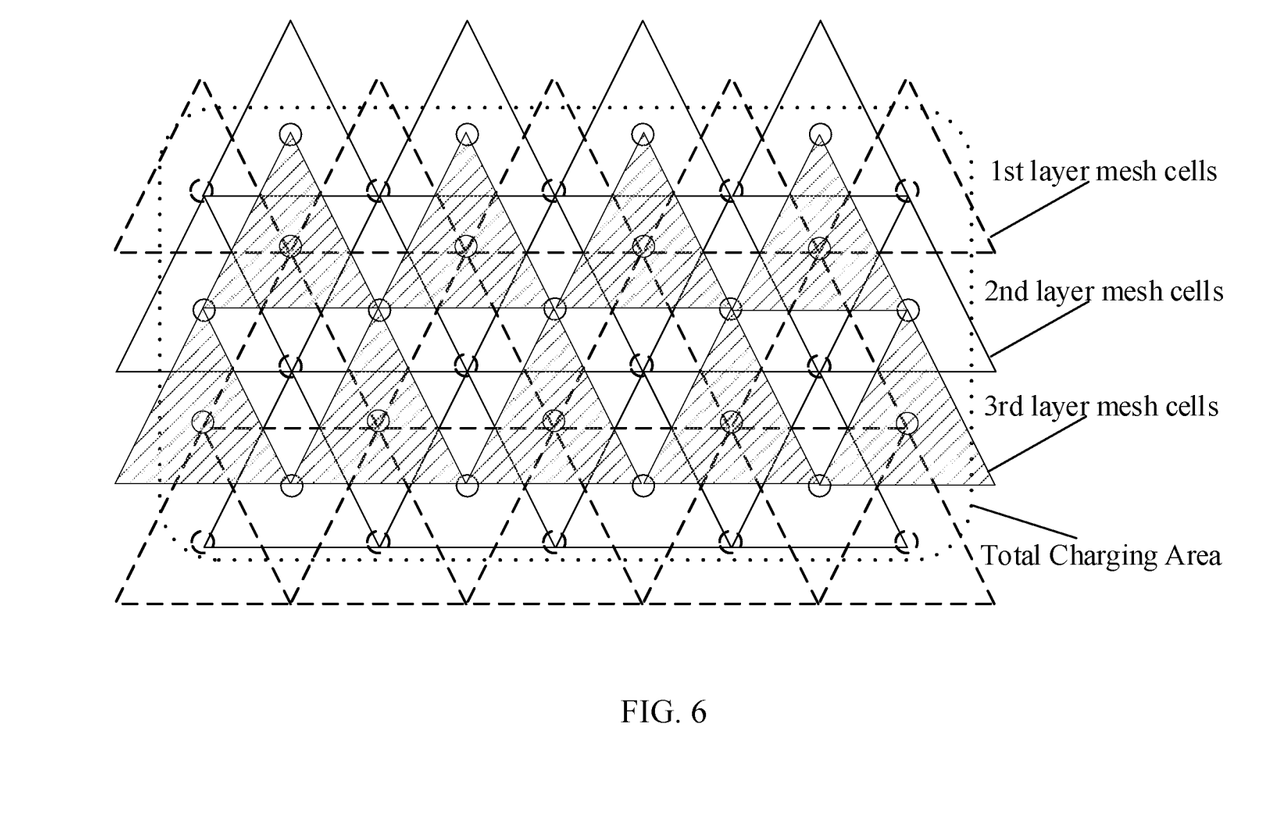
FIG. 6 is a graphical representation illustrating a three-layer triangle mesh cell placement pattern, consistent with exemplary embodiments of the present disclosure.

FIG. 6 shows a layout of a three-layer triangle mesh cell placement pattern. The dotted rectangle represents the required charging area. The first and second layer of the triangle mesh cells arrange in the same placement pattern as shown in FIG. 5. The shaded triangles with circles at their centers represent the third-layer triangle mesh cells. The shaded triangle mesh cells cover most part of the required charging area on the third layer, and their locations are determined by the centers of three adjacent triangle mesh cells on the second layer. As shown in FIG. 6, the vertices of every third-layer triangle locate at the positions of the center circles of adjacent second-layer triangles. In one exemplary embodiment, the number of the mesh cells on the third layer is the number of mesh cells that can connect all of the centers of the mesh cells on the second layer. In another exemplary embodiment, the number of the mesh cells on the third layer is the minimal number of mesh cells that cover most part of the required charging area. Again, the third-layer mesh cells orient in the same direction, connect each other with their vertices, and do not overlap with each other on the same layer.

Figure 7A:
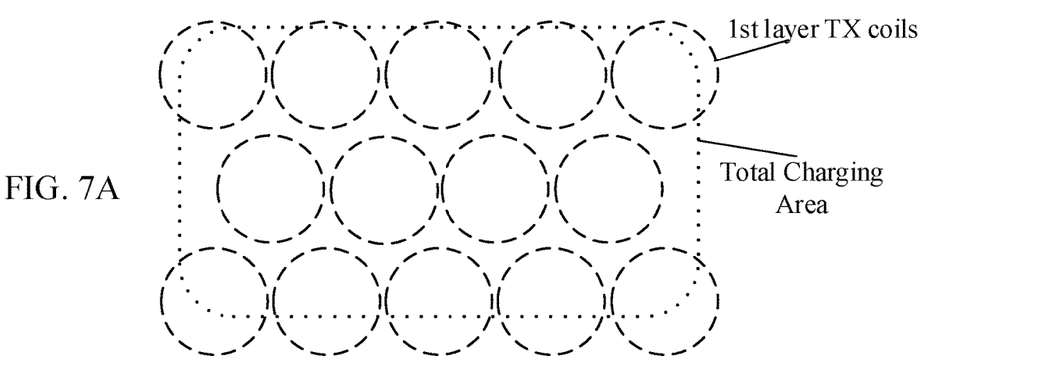
FIGS. 7A-7C are graphical representations illustrating multi-coil placement patterns for power transmitters, consistent with exemplary embodiments of the present disclosure.
Figure 7B:
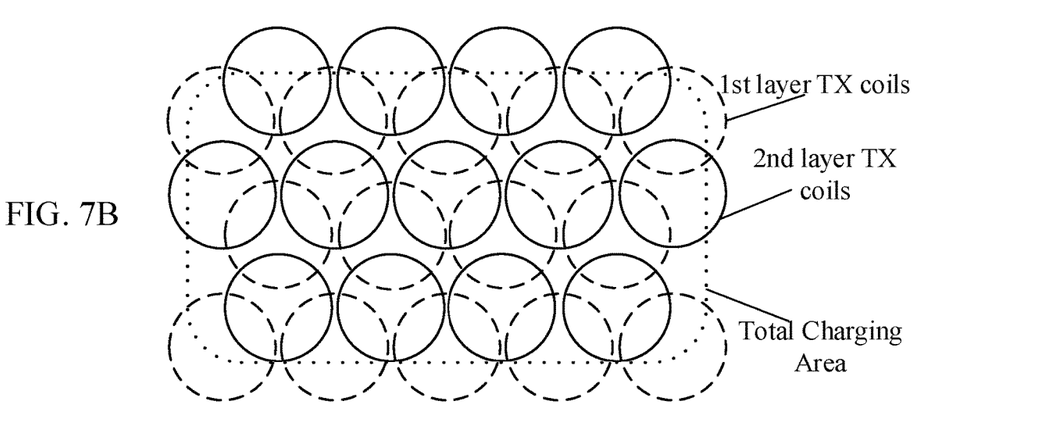
Figure 7C:
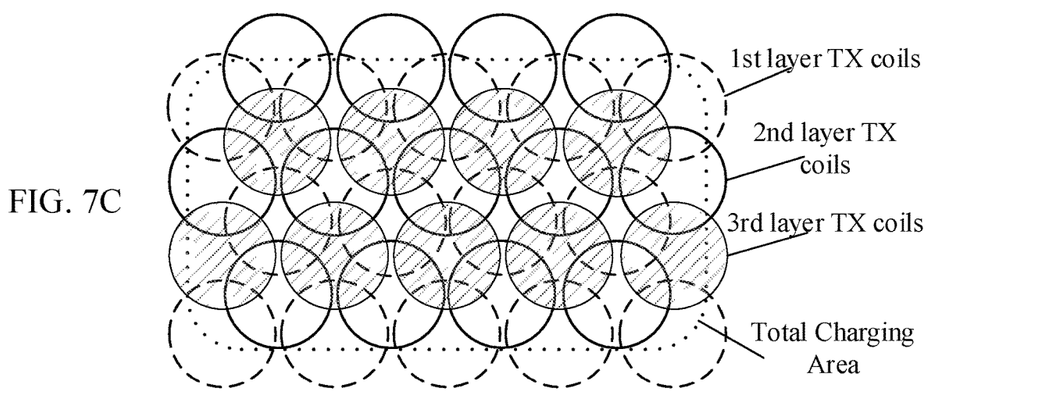

FIGS. 4-6 show one set of exemplary layout of mesh cells. TX coils can be placed based on the layout of the mesh cells. One TX coil substitutes one mesh cell. The circle center of each mesh cell represents the position of the center of each TX coil. The length parameter w of the mesh cell represents the distance between two adjacent TX coils. A top view of the exemplary three-layer multi-coil embodiment is shown in FIGS. 7A-7C. The edges of two adjacent TX coil on the same layer can be in contact with each other or spaced apart with a small distance as shown in FIGS. 7A-7C. The placement of mesh cells and TX coils shown in FIG. 4 and FIG. 7A correspond Scenario No. 2 in Table 1; the placement of mesh cells and TX coils shown in FIG. 6 and FIG. 7C correspond to Scenario No. 4 in Table 1.

Figure 8:
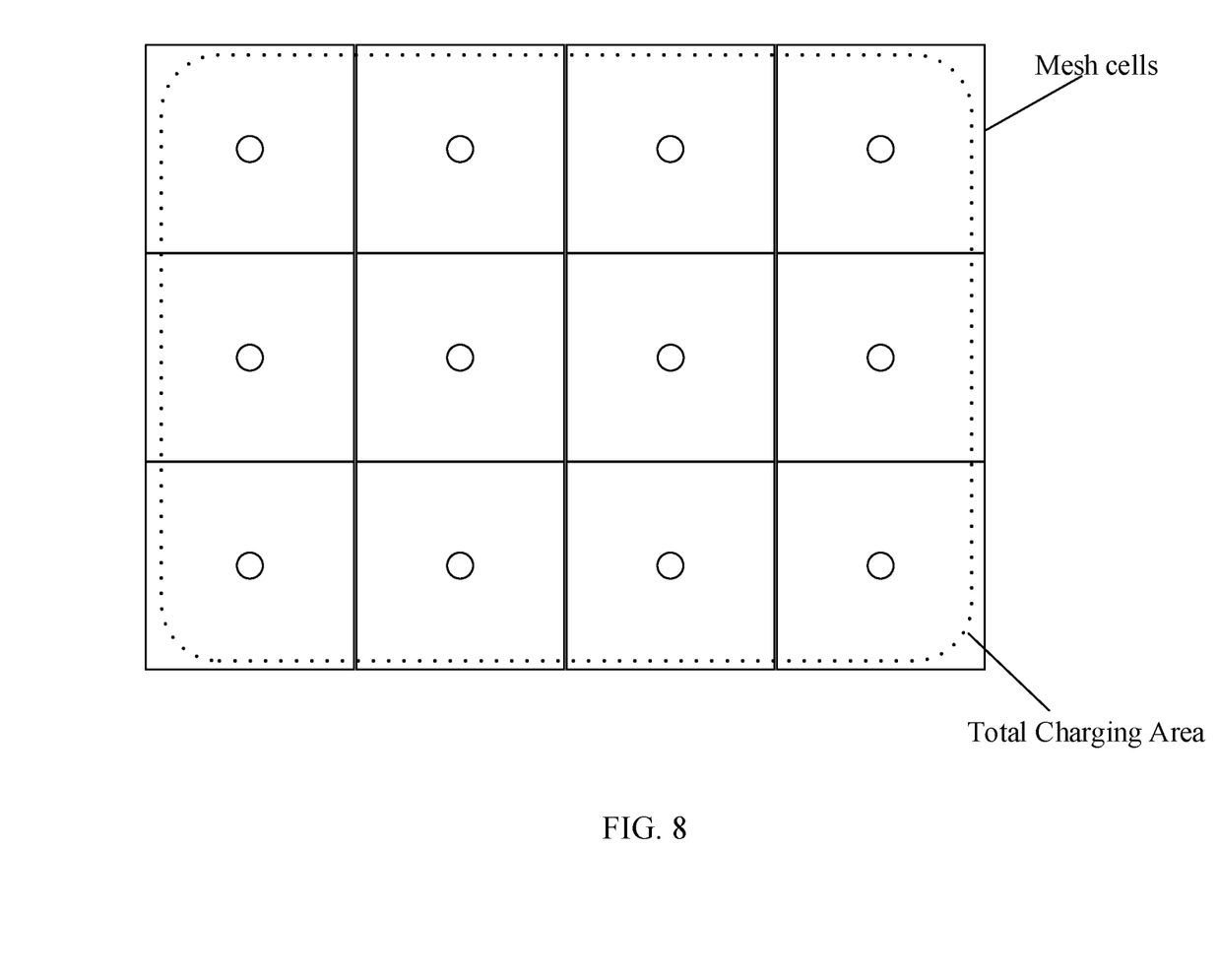
FIG. 8 is a graphical representation illustrating a one-layer square mesh cell placement pattern, consistent with exemplary embodiments of the present disclosure.

FIG. 8 shows a layout of a one-layer square mesh cell placement pattern. The dotted rectangle represents a required charging area. The solid-line squares with circles at their centers represent the square mesh cells. The mesh cells cover most part of the required charging area. In one exemplary embodiment, the number of the mesh cells is the minimal number of mesh cells that cover most part of the required charging area. All the mesh cells locate side by side with the same orientation, and do not overlap with each other on the same layer.

Figure 9:
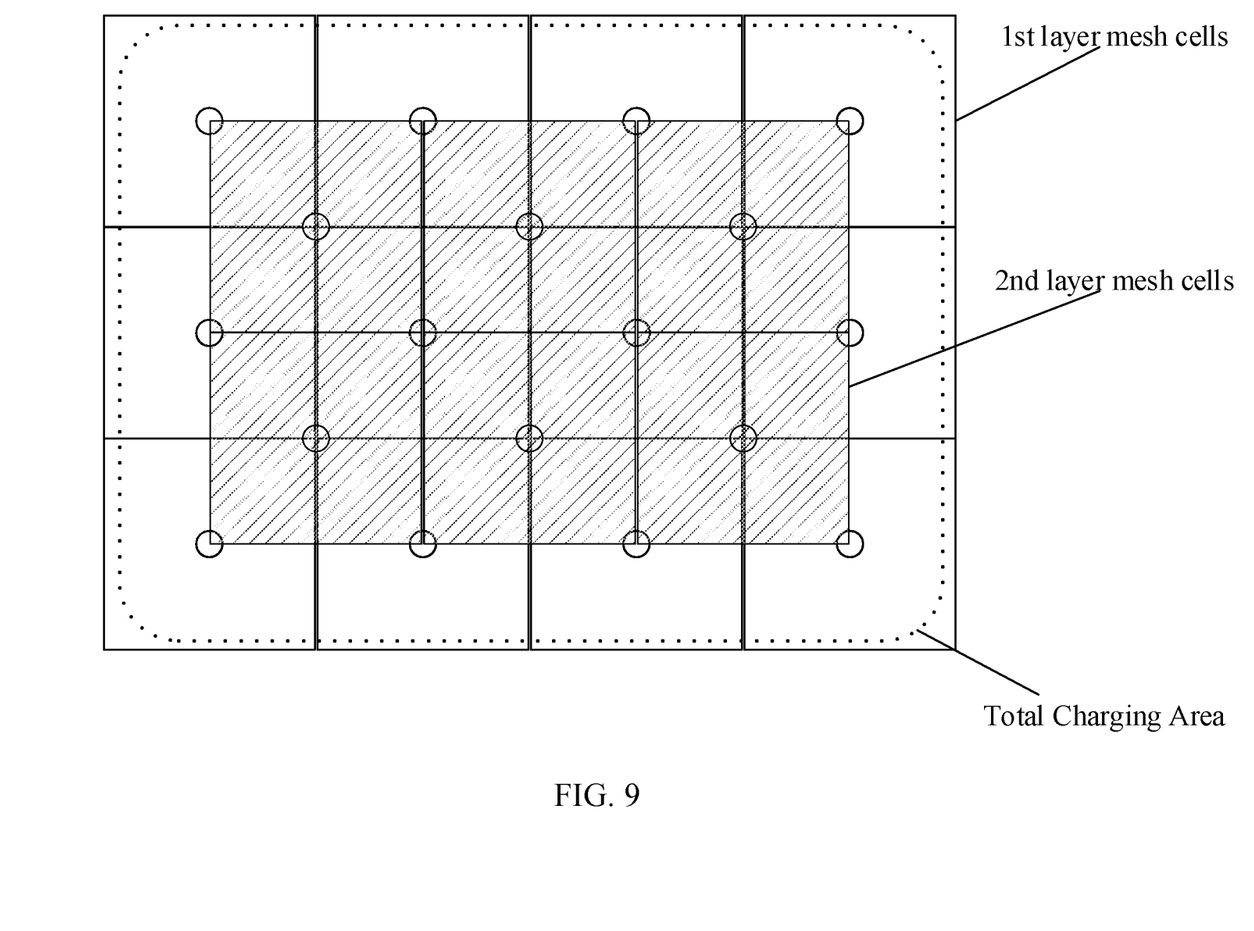
FIG. 9 is a graphical representation illustrating a two-layer square mesh cell placement pattern, consistent with exemplary embodiments of the present disclosure.

FIG. 9 shows a layout of a two-layer square mesh cell placement pattern. The dotted rectangle represents the required charging area. The solid-line squares with circles at their centers represent the first-layer square mesh cells. Their placement pattern is the same as shown in FIG. 8. The shaded squares with circles at their centers represent the square mesh cells on the second layer. The locations of the shaded square mesh cells are determined by the center of four adjacent square mesh cells on the first layer. As shown in FIG. 9, the four vertices of every second-layer square locate at the positions of the center circles of four adjacent first-layer squares. In one exemplary embodiment, the number of the mesh cells on the second layer is the number of mesh cells that can connect all of the centers of the mesh cells on the first layer. In another exemplary embodiment, the number of the mesh cells on the second layer is the minimal number of mesh cells that cover most part of the required charging area. Again, all the mesh cells on the second layer locate side by side with the same orientation, and do not overlap with each other on the same layer.

Figure 10A:
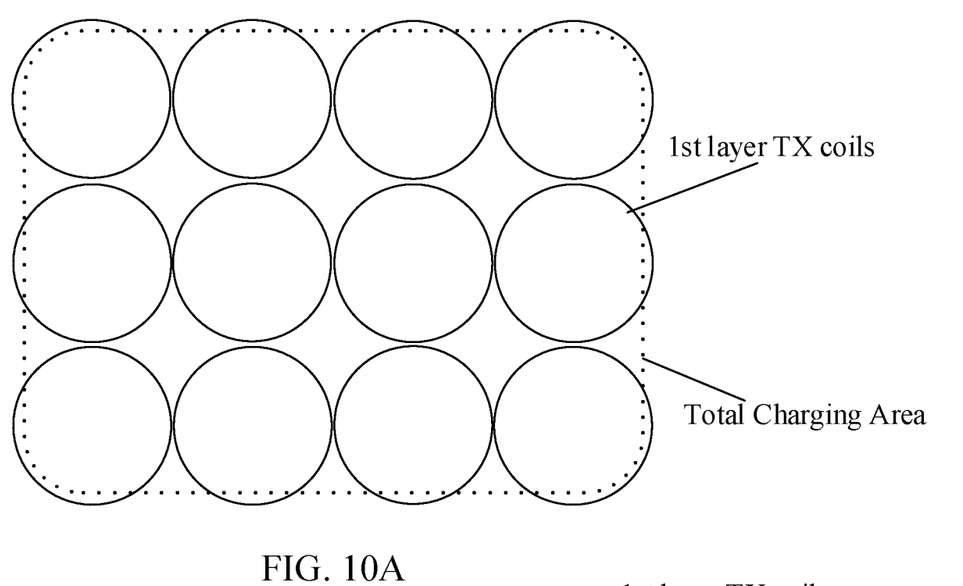
FIGS. 10A-10B are graphical representations illustrating multi-coil placement patterns for power transmitters, consistent with exemplary embodiments of the present disclosure.
Figure 10B:
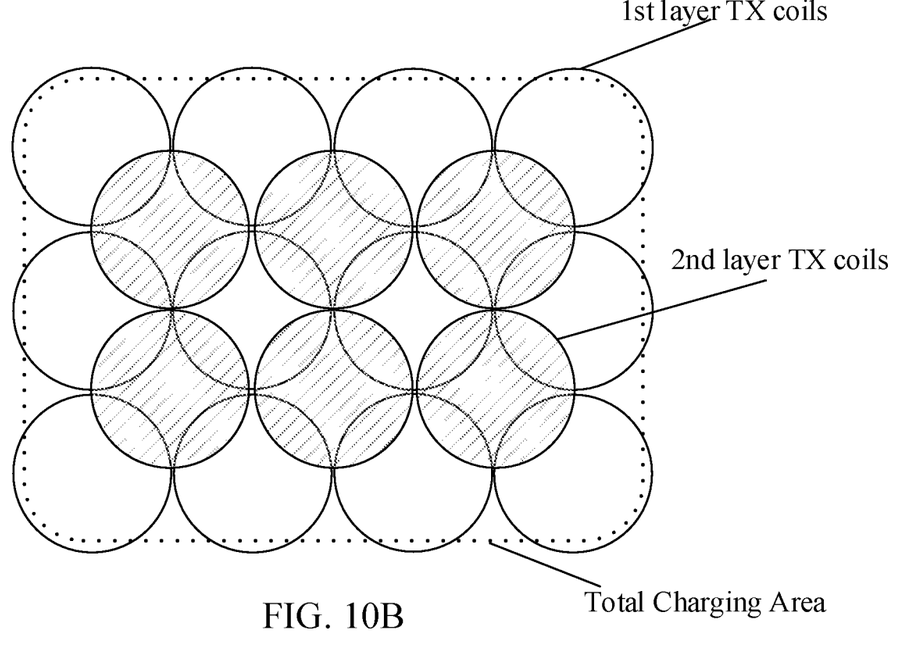

FIGS. 8 and 9 show another set of exemplary layout of mesh cells. TX coils can be placed based on the layout of the mesh cells. One TX coil substitutes one mesh cell. The circle center of each mesh cell represents the position of the center of each TX coil. The length parameter w of the mesh cell represents the distance between two adjacent TX coils. A top view of the exemplary two-layer multi-coil embodiment is shown in FIGS. 10A-10B. The edges of two adjacent TX coil on the same layer can be in contact with each other or spaced apart with a distance as shown in FIGS. 10A-10B. The placement of mesh cells and TX coils shown in FIG. 8 and FIG. 10A correspond Scenario No. 1 in Table 1; the placement of mesh cells and TX coils shown in FIG. 9 and FIG. 10B correspond to Scenario No. 3 in Table 1.

In one embodiment, the ratio of a/b may be no less than $\sqrt{2}$, corresponding to Scenario No. 1 in Table 1. The TX coils may be placed on one layer and centers of adjacent TX coils may be spaced with the length parameter w, where, w≤$\sqrt{2}$a. Centers of adjacent four TX coils may form a square, as shown in FIG. 10(a).

In another embodiment, the ratio of a/b may follow $$\frac{2}{\sqrt{3}} \leq \frac{a}{b} < \sqrt{2},$$

corresponding to Scenario No. 2 in Table 1. The TX coils may be placed on one layer and centers of adjacent TX coils may be spaced with the length parameter w, where, w≤$\sqrt{3}$a. Centers of adjacent three TX coils may form an equilateral triangle, as shown in FIG. 7A.

In another embodiment, the ratio of a/b may follow $$1 \leq \frac{a}{b} < \frac{2}{\sqrt{3}},$$

corresponding to Scenario No. 3 in Table 1. The TX coils may be placed on two layers and on each layer, centers of adjacent TX coils may be spaced with the length parameter w, where, w≤2a. As shown in FIG. 10B, on each layer, centers of adjacent four TX coils may form a square, and each of the TX coils on the second layer may be placed in a central area of the square formed by the centers of adjacent four TX coils on the first layer.

In another embodiment, the ratio of a/b may follow $$\frac{2}{3} \leq \frac{a}{b} < 1,$$

corresponding to Scenario No. 4 in Table 1. The TX coils may be placed on three layers and, on each layer, centers of adjacent TX coils may be spaced with the length parameter w, where, w≤3a. As shown in FIG. 7C, on each layer, centers of adjacent three TX coils may form an equilateral triangle, and each of the TX coils on the third layer may be placed in a central area of the equilateral triangle formed by the centers of the TX coils on the second layer, each of the TX coils on the second layer may be placed in a central area of the equilateral triangle formed by the centers of the TX coils on the first layer.

In another embodiment, a wireless charging system may include a charging area and a plurality of TX coils placed to cover the charging area. Each TX coil may have an effective charging area. A radius of the effective charging area may be denoted as a, and a half of a width of the TX coil may be denoted as b. The centers of the TX coils may be spaced with a distance w. The parameters a, b and w may have the following relations:

$$\text{if } \frac{a}{b} \geq \sqrt{2}, w \leq \sqrt{2}\,a;$$

$$\text{if } \frac{2}{\sqrt{3}} \leq \frac{a}{b} < \sqrt{2}, w \leq \sqrt{3}\,a;$$

$$\text{if } 1 \leq \frac{a}{b} < \frac{2}{\sqrt{3}}, w \leq 2a; \text{ and}$$

$$\text{if } \frac{2}{3} \leq \frac{a}{b} < 1, w \leq 3a.$$

In some embodiments, the TX coils may be placed into one or multiple layers in the wireless charging system. The centers of adjacent TX coils may form into geometric shapes, for example, equilateral triangles, squares, etc. The number of layers and the shapes are not limited in scope by the embodiments disclosed herein.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for placing power transmitter coils in a wireless charging system, comprising:
    obtaining a width parameter of an effective charging area a and a width parameter of a power transmitter coil b;
    calculating a ratio of the width parameters a/b;
    determining a shape, size and number of layers of mesh cells based on the ratio of a/b;
    determining a layout of the mesh cells;
    covering a required charging area using the mesh cells based on the determined shape, size, number of layers, and layout; and
    replacing the mesh cells with the power transmitter coils.

2. The method of claim 1, wherein the mesh cells have an equilateral triangle shape.

3. The method of claim 1, wherein the mesh cells have a square shape.

4. The method of claim 1, wherein each mesh cell has a center, and replacing the mesh cells with the power transmitter coils comprises placing centers of the power transmitter coils at the centers of the mesh cells.

5. The method of claim 1, wherein:
    if $$\frac{a}{b} \geq \sqrt{2},$$

determining a shape, size and number of layers of mesh cells based on the ratio of a/b comprises determining the mesh cells each having a square shape with a length parameter w, where, w≤√2a, and mesh cells having one layer;
    if $$\frac{2}{\sqrt{3}} \leq \frac{a}{b} < \sqrt{2},$$

determining the shape, size and number of layers of mesh cells based on the ratio of a/b comprises determining the mesh cells each having a triangle shape with the length parameter w, where, w≤√3a, and mesh cells having one layer;
    if $$1 \leq \frac{a}{b} < \frac{2}{\sqrt{3}},$$

determining the shape, size and number of layers of mesh cells based on the ratio of a/b comprises determining the mesh cells each having a square shape with the length parameter w, where, w≤√2a, and mesh cells having two layers; and
    if $$\frac{2}{3} \leq \frac{a}{b} < 1,$$

determining the shape, size and number of layers of mesh cells based on the ratio of a/b comprises determining the mesh cells each having a triangle shape with the length parameter w, where, w≤√3a, and mesh cells having three layers.

6. The method of claim 5, wherein the distance between the centers of two adjacent power transmitter coils is w.

7. The method of claim 1, wherein the power transmitter coil has a circular shape and the width parameter b is the radius of the power transmitter coil.

8. The method of claim 1, wherein the power transmitter coil has a square shape and the width parameter b is a half of the length of a side of the power transmitter coil.

9. The method of claim 1, wherein the effective charging area is a circle, and the width parameter a is the radius of the effective charging area.

10. The method of claim 1, wherein the effective charging area is a charging area of a power transmitter coil, where if a center of a power receiver coil is placed inside of the area, a coil-to-coil efficiency is not less than a pre-determined value.

11. The method of claim 10, wherein the coil-to-coil efficiency is calculated by the ratio of the power receiver coil output power over the power transmitter coil input power.

12. The method of claim 10, wherein the pre-determined value is 90%.

13. The method of claim 1, wherein the width parameter a is a maximum horizontal distance between a center of a power transmitter coil and a center of a power receiver coil, within which, the coil-to-coil efficiency is not less than a predetermined value.

14. The method of claim 13, wherein the coil-to-coil efficiency is calculated by the ratio of the power receiver coil output power over the power transmitter coil input power.

15. The method of claim 13, wherein the pre-determined value is 90%.

16. A wireless charging system, comprising:
    a charging area;
    a plurality of power transmitter coils placed to cover the charging area, each power transmitter coil having an effective charging area, wherein:
    a indicates a radius of the effective charging area and b indicates a half of a width of the power transmitter coil,
    if $$\frac{a}{b} \geq \sqrt{2},$$

the plurality of power transmitter coils are placed on one layer and centers of adjacent power transmitter coils are spaced with a length parameter w, where, w≤√2a, and centers of adjacent four power transmitter coils form a square;
    if $$\frac{2}{\sqrt{3}} \le \frac{a}{b} < \sqrt{2},$$

the plurality of power transmitter coils are placed on one layer and centers of adjacent power transmitter coils are spaced with a length parameter w, where, w≤√3a, and centers of adjacent three power transmitter coils form an equilateral triangle;
if $$1 \le \frac{a}{b} < \frac{2}{\sqrt{3}},$$

the plurality or power transmitter coils are placed on two layers and on each layer, centers of adjacent power transmitter coils are spaced with a length parameter w, where, w≤√2a, and, on each layer, centers of adjacent four power transmitter coils form a square, and each of the power transmitter coils on the second layer is placed in a central area of the square formed by the centers of adjacent four power transmitter coils on the first layer; and
if $$\frac{2}{3} \le \frac{a}{b} < 1,$$

the plurality of power transmitter coils are placed on three layers and, on each layer, centers of adjacent power transmitter coils are spaced with a length parameter w, where, w≤√3a, and, on each layer, centers of adjacent three power transmitter coils form an equilateral triangle, and each of the power transmitter coils on the third layer is placed in a central area of the equilateral triangle formed by the centers of the power transmitter coils on the second layer, each of the power transmitter coils on the second layer is placed in a central area of the equilateral triangle formed by the centers of the power transmitter coils on the first layer.

17. A wireless charging system, comprising:
a charging area;
a plurality of power transmitter coils placed to cover the charging area, each power transmitter coil having an effective charging area, wherein:
a indicates a radius of the effective charging area and b indicates a half of a width of the power transmitter coil,
centers of power transmitter coils are spaced with a distance w, $$\text{if } \frac{a}{b} \ge \sqrt{2}, w \le \sqrt{2}\,a;$$

$$\text{if } \frac{2}{\sqrt{3}} \le \frac{a}{b} < \sqrt{2}, w \le \sqrt{3}\,a;$$

$$\text{if } 1 \le \frac{a}{b} < \frac{2}{\sqrt{3}}, w \le 2a; \text{ and}$$

$$\text{if } \frac{2}{3} \le \frac{a}{b} < 1, w \le 3a.$$

18. A wireless charging system, comprising:
a charging area; and
a plurality of power transmitter coils placed on two layers to cover the charging area, each power transmitter coil having an effective charging area, wherein:
a indicates a radius of the effective charging area and b indicates a half of a width of the power transmitter coil,
centers of adjacent power transmitter coils in a same layer are spaced with a distance $$\text{if } \frac{a}{b} \ge \sqrt{2}, w \le \sqrt{2}\,a;$$

$$\text{if } \frac{2}{\sqrt{3}} \le \frac{a}{b} < \sqrt{2}, w \le \sqrt{3}\,a;$$

$$\text{if } 1 \le \frac{a}{b} < \frac{2}{\sqrt{3}}, w \le 2a; \text{ and}$$

$$\text{if } \frac{2}{3} \le \frac{a}{b} < 1, w \le 3a,$$

wherein centers of every three adjacent power transmitter coils on each layer form an equilateral triangle, and
each of the power transmitter coils on the second layer is placed in a central area of the triangle formed by the centers of adjacent three power transmitter coils on the first layer.

19. The system of claim 18, further comprising a third layer of power transmitter coils on the second layer, centers of adjacent three power transmitter coils form an equilateral triangle on each layer, and each of the power transmitter coils on the third layer is placed in a central area of the equilateral triangle formed by the centers of the power transmitter coils on the second layer.

20. A wireless charging system, comprising:
a charging area; and
a plurality of power transmitter coils placed on two layers to cover the charging area, each power transmitter coil having an effective charging area, wherein:
a indicates a radius of the effective charging area and b indicates a half of a width of the power transmitter coil,
centers of adjacent power transmitter coils in a same layer are spaced with a distance w, $$\text{if } \frac{a}{b} \ge \sqrt{2}, w \le \sqrt{2}\,a;$$

$$\text{if } \frac{2}{\sqrt{3}} \le \frac{a}{b} < \sqrt{2}, w \le \sqrt{3}\,a;$$

$$\text{if } 1 \le \frac{a}{b} < \frac{2}{\sqrt{3}}, w \le 2a; \text{ and}$$

$$\text{if } \frac{2}{3} \le \frac{a}{b} < 1, w \le 3a,$$

wherein centers of every four adjacent power transmitter coils on each layer form a square, and
each of the power transmitter coils on the second layer is placed in a central area of the square formed by the centers of adjacent four power transmitter coils on the first layer.

\* \* \* \* \*

UNITED STATES PATENT AND TRADEMARK OFFICE
CERTIFICATE OF CORRECTION

PATENT NO. : 10,985,581 B2
APPLICATION NO. : 15/892043
DATED : April 20, 2021
INVENTOR(S) : Tun Li et al.

Page 1 of 1

It is certified that error appears in the above-identified patent and that said Letters Patent is hereby corrected as shown below:

In the Claims

Claim 5, Column 10, Line 2, "parameter w, where $w \leq \sqrt{2}a$, and mesh cells having two" should read --parameter w, where $w \leq 2a$, and mesh cells having two--.

Claim 5, Column 10, Line 14, "parameter w, where $w \leq \sqrt{3}a$, and mesh cells having three" should read --parameter w, where $w \leq 3a$, and mesh cells having three--.

Claim 16, Column 11, Line 19, "$\sqrt{2}a$, and, on each layer, centers of adjacent four power" should read --2a, and, on each layer, centers of adjacent four power--.

Claim 16, Column 11, Line 34, "$\sqrt{3}a$, and, on each layer, centers of adjacent three power" should read --3a, and, on each layer, centers of adjacent three power--.

Claim 18, Column 12, Line 9, "are spaced with a distance" should read --are spaced with a distance w,--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*